UNITED STATES PATENT OFFICE.

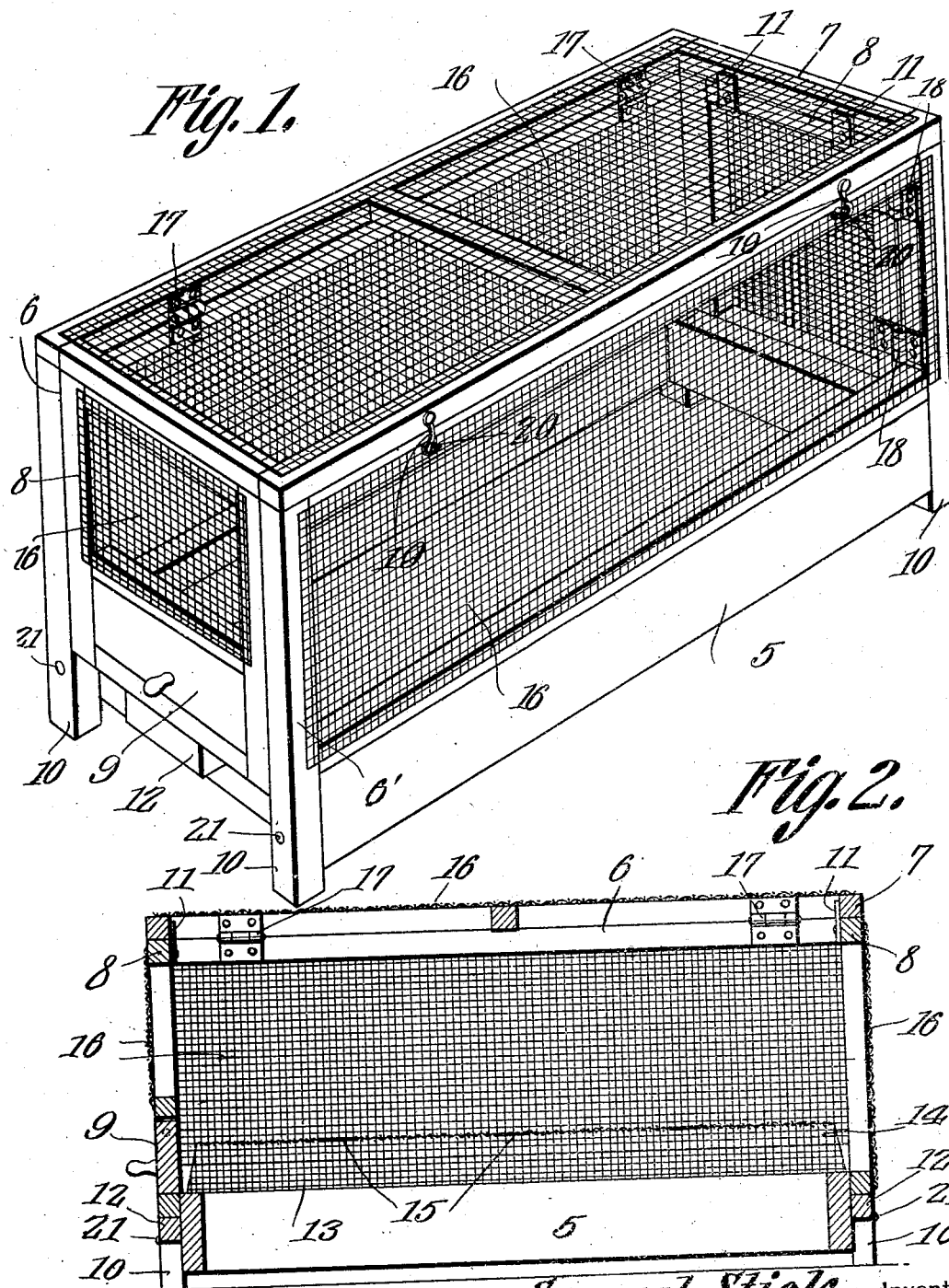

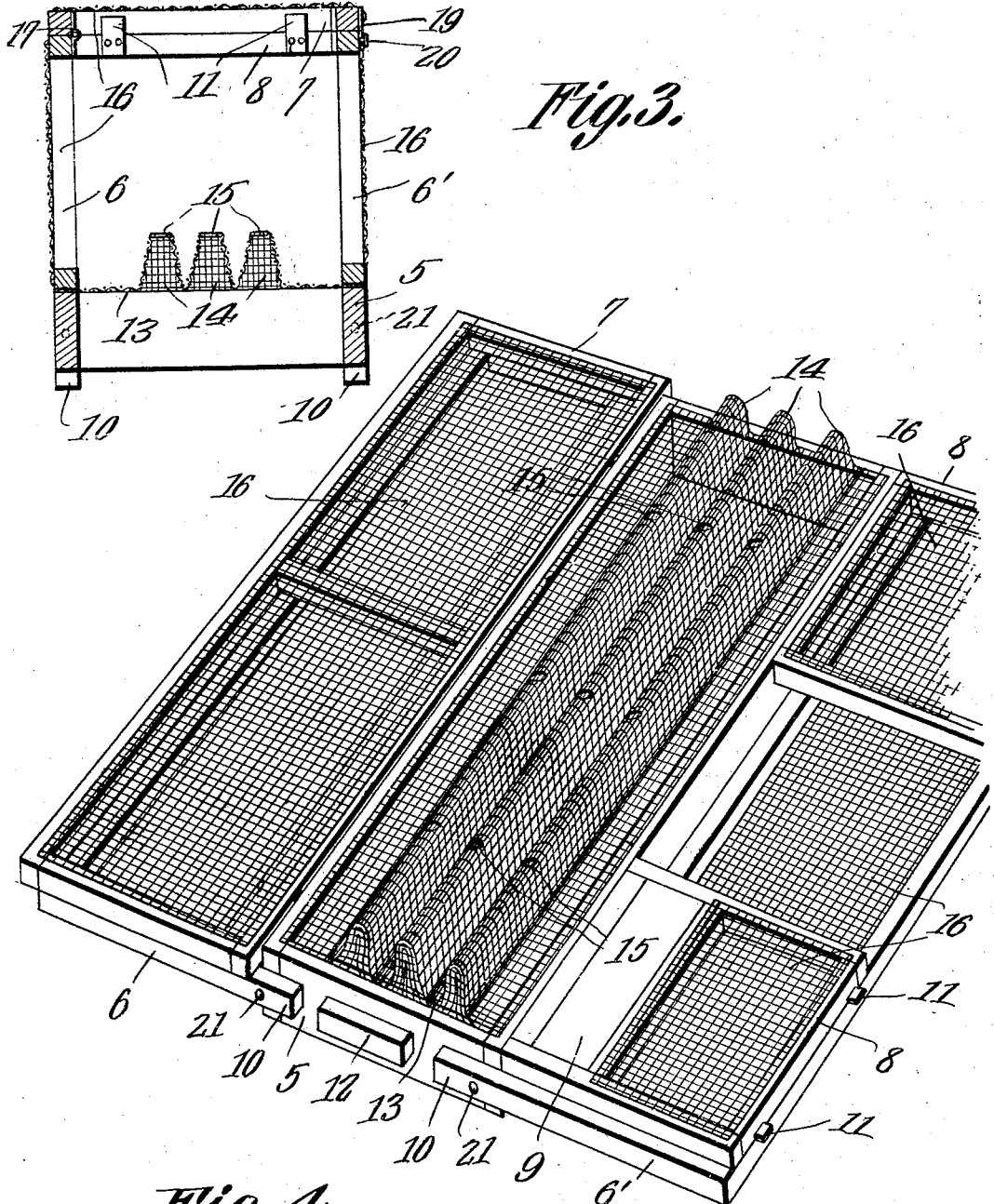

SAMUEL STICK, OF RIDGEVILLE, INDIANA.

FLY-TRAP.

1,033,289.

Specification of Letters Patent. Patented July 23, 1912.

Application filed March 29, 1912. Serial No. 687,193.

*To all whom it may concern:*

Be it known that I, SAMUEL STICK, a citizen of the United States, residing at Ridgeville, in the county of Randolph and State of Indiana, have invented a new and useful Fly-Trap, of which the following is a specification.

This invention relates to fly traps, and has for its primary object to provide a device of this character which shall be simple, substantial and inexpensive in construction, which may be readily collapsed when not in use, and which is hygienic and efficient in its use.

With the foregoing and other objects in view, which will be apparent as the invention is better understood, this invention is embodied in the novel construction of parts hereinafter described and particularly pointed out in the appended claims, reference being had to the accompanying drawings wherein the preferred form of the invention is illustrated, and wherein,—

Figure 1 is a perspective view of the fly trap. Fig. 2 is a longitudinal vertical section thereof. Fig. 3 is a transverse section thereof. Fig. 4 is a perspective view of the fly trap when collapsed or folded, parts being broken away.

Referring specifically to the drawings, wherein similar reference characters have been employed to denote corresponding parts, the fly trap is shown as comprising in its essentials, the bottom having inlets therein, sides hinged to the bottom, ends hinged to one side, and a top hinged to the other side. The bottom comprises the rectangular frame 5 which has a reticulated or meshed panel 13 secured to its upper side, this panel being provided with a plurality, in this case three, of longitudinal corrugations 14 which have the restricted inlets 15 along the ridges thereof. The sides embody the rectangular frames 6 and 6', respectively; the ends, the frames 8; and the top the rectangular frame 7; all of said frames being provided with reticulated or meshed panels 16. The end pieces or portions of the frames 6 and 6' are extended to provide legs 10, these legs 10 passing over the end portions of the bottom frame 5 and being pivoted thereto by means of pins 21. The sides are in this manner hinged to the bottom and are permitted to swing into the plane of the bottom, and when the sides are swung in erect position relative to the bottom, the legs 10 depend below the bottom frame 5 in order to elevate or space the frame 5 above the base or support on which the fly trap is set. The top frame 7 is hinged to the side frame 6 by means of the hinges 17, and the end frames 8 are hinged to the side frame 6' by means of the hinges 18, the respective end and top frames being adapted to swing against the side frames at their hinged edges when opened in order to limit the outward movement thereof.

On the end portions of the bottom frame 5 are secured stops 12 against which the frames 8 are adapted to seat when the trap is erected, thereby limiting the movement of the side frame 6'. The side frame 6 is adapted to abut against the end frame 8 when the trap is erected, and the top frame 7 is adapted to seat on the end frames, hooks 19 being carried by the free edge of the top frame 7 and being engageable with headed pins or other like members 20 secured to the side frames 6'. The end frames 8 have lips 11 projecting from their upper edges and engageable over the inner faces of the end portions of the top frame 7 when the trap is erected in order to prevent the outward movement of the end frames. It will therefore be seen that the hooks 19 and the lips 11 provide means for locking the various parts of the trap together when erected, in order to present a substantial structure. One of the ends is provided with the door 9, which in being swung open permits the flies and other insects entrapped to pass therefrom.

When the trap is erected, a suitable inclosure is provided, and the legs 10 will project below the bottom frame 5 to space the bottom frame 5 above the object on which the trap is set, in order that the flies and other insects may pass below the bottom. The flies and other insects are attracted to the trap by means of any suitable bait contained within the trap, and the flies and other insects may enter the trap through the restricted inlets 15 along the ridges of the corrugations 14, in which event, the retreat of the flies or other insects is prevented, thus entrapping the flies and other insects. The flies and other insects may be exterminated in any suitable manner, such as by opening the door 9 and permitting the same to escape into a device or exterminator for this purpose. This trap is adapted particularly for use out of doors, and may be set in various localities, where it is desired to catch the flies and other insects.

When not in use, the trap may be readily collapsed or folded, this being accomplished by disengaging the hooks 19 from the members 20, which will permit the sides to swing into the plane of the bottom, and the top and ends may then be folded against the respective sides, as clearly shown in Fig. 4. In this manner the trap may be compactly folded when not in use, in order to be conveniently stored away or carried about, and the trap when opened in this manner may be readily cleansed. The trap may be readily erected, and when erected presents a neat appearance and assumes a smooth box-like form.

The present trap is simple in construction, and is capable of manufacture at a small cost, and in its use is both hygenic and efficient. It is understood however, that this trap is susceptible of alterations or deviations in its details within the scope of the appended claims without departing from the spirit of the invention, such as changes in size, proportions, materials, and the like.

Having described the invention, what is claimed as new is:—

1. A collapsible fly trap constituting a bottom having inlets, sides, ends and a top hingedly connected, means for locking the said parts together when erected, and members carried by some of said parts projectable below the bottom when the parts are erected and designed to support the trap.

2. A collapsible fly trap constituting a bottom having inlets, sides hinged to the bottom, ends hinged to one side, a top hinged to the other side, means for locking said parts together when erected, and members carried by some of said parts projectable below the bottom when the parts are erected and designed to support the trap.

3. A collapsible fly trap constituting a bottom having inlets, sides hinged to the bottom, ends hinged to one side, a top hinged to the other side, means for locking said parts together when erected and members carried by the sides projectable below the bottom when the parts are erected and designed to support the trap.

4. A collapsible fly trap constituting a bottom having inlets, sides having legs pivoted to the bottom, ends hinged to one side, a top hinged to the other side, and means for locking the said parts together when erected.

5. A collapsible fly trap constituting a bottom having inlets therein, stops on the end portions of the bottom, sides having legs pivoted to the end portions of the bottom, ends hinged to one side and adapted to swing against the said stops, a top hinged to the other side, means for locking the ends to the top, and means for locking the top to the former side.

6. A collapsible fly trap constituting a bottom frame having a reticulated panel provided with corrugations and inlets along the ridges of the corrugations, side frames having legs pivoted to the bottom frame, end frames hinged to one side frame, a top frame hinged to the other side frame, the side, end and top frames being provided with reticulated panels, lips projecting from the upper edges of the end frames engageable with the end portions of the top frame, and means for engaging the free edge of the top frame with the former side frame.

In testimony that I claim the foregoing as my own, I have hereto affixed my signature in the presence of two witnesses.

SAMUEL STICK.

Witnesses:
RUSSEL W. ADDINGTON,
RAY ARMSTRONG.

---

Copies of this patent may be obtained for five cents each, by addressing the "Commissioner of Patents, Washington, D. C."